United States Patent [19]

Scheetz

[11] 4,285,168

[45] Aug. 25, 1981

[54] FIBER LUBRICATED BEARINGS

[75] Inventor: Howard A. Scheetz, Lancaster, Pa.

[73] Assignee: The Polymer Corporation, Reading, Pa.

[21] Appl. No.: 93,695

[22] Filed: Nov. 13, 1979

[51] Int. Cl.$^3$ ............................................... E05F 11/02
[52] U.S. Cl. .................................... 51/281 R; 51/288;
82/1 C; 83/835; 428/91
[58] Field of Search .................... 428/85, 91, 409, 422,
428/423.1, 424.6, 902; 308/DIG. 8, DIG. 9;
51/281 R; 82/288, 1 C; 83/835

[56] References Cited

U.S. PATENT DOCUMENTS

| | | | |
|---|---|---|---|
| 3,514,307 | 5/1970 | Hallenbeck | 428/91 |
| 3,741,855 | 6/1973 | Harrison | 428/902 |

*Primary Examiner*—Marion McCamish
*Attorney, Agent, or Firm*—Richard O. Church

[57] ABSTRACT

A plastic bearing and wear surface is disclosed which has low friction fibers protruding from its surface. The bearing is made by filling a plastic matrix with low friction fibers whose mechanical properties relate to those of the matrix in such a manner that when the matrix is machined, the matrix material will selectively be removed leaving some of the fibers imbedded in the matrix with their free ends protruding from and distributed over the machined surface.

1 Claim, No Drawings

FIBER LUBRICATED BEARINGS

BACKGROUND OF THE INVENTION

1. Field of the Invention

This invention relates to low friction plastic bearings and more particularly to bearings made from engineering plastics that are filled with lubricant fibers.

2. Description of the Prior Art

Many synthetic high polymers, sometimes referred to as engineering plastics, are available for the fabrication of functional elements of machines such as bearings, gears, cams, and other load bearing and wear surfaces. These plastics are variously distinguished by a number of physical properties, including moderate to low coefficients of friction, resistance to wear and abrasion, toughness, high impact and tensile strengths, high modulus, moderate to high temperature capabilities, lightness of weight, nongalling operation and the like. Representative of these engineering plastics are the polyamides, polyacetals, polycarbonates, polysulfones, fluorocarbons, polyesters, polyolefins, polyimides, polyamide-imides and rigid polyurethanes.

Plastic bearings made from engineering plastics are often described as being self-lubricating, by which is meant that in some applications they can be used without an external source of lubrication. In point of fact, however, plastics usually do not wear well when in direct frictional engagement with metals, but they do have the ability to wet out the metal surfaces with which they are in contact to form a lubricating film that lowers friction and wear.

To improve upon the natural lubricity of plastics, it is conventional to add lubricant fillers including inorganics, e.g. molybdenum disulfide, boron nitride, antimony trioxide and vermiculite; organics, e.g. oils, fatty acids, carbon and graphite; and low friction plastics, e.g. fluorocarbons and polyolefins. The effectiveness of a lubricant filler to reduce wear is largely related to its coefficient of friction if the filler is made available at the surface of the matrix material and will wet out the bearing surface. It can be understood that if the lubricant filler is encapsulated within matrix material, the filler will not lubricate the bearing surface until the matrix material wears away to expose the lubricant filler. This can prolong the break in period and significantly reduce the useful life of the bearing.

OBJECTS OF THE INVENTION

Accordingly, it is an object of this invention to provide filled plastic bearing materials having improved properties of friction and wear.

Another object of this invention is to provide filled plastic bearing materials that require little or no break in time.

Another object is to provide plastic bearings in which lubricant fillers are immediately available to wet out the bearing surfaces.

Another object of this invention is to provide a plastic bearing which is self-lubricating and has a low coefficient of friction, a low rate of wear and a fast break in time.

DETAILED DESCRIPTION OF THE INVENTION

In accordance with this invention, it has been found that if a plastic matrix is filled with a low friction fiber having an appropriate length and aspect ratio and with mechanical properties properly related to those of the matrix material, the matrix material will be selectively removed from the surface upon machining leaving some of the fibers imbedded in the matrix with their free ends distributed over the machined surface of the matrix. By these means, the free ends of the lubricant fibers are immediately made available as a source of lubricant to wet out the bearing surfaces.

Quite generally, the lubricant fillers useful in the practice of this invention have a substantial length, e.g. $\frac{1}{4}$ inch; they should have an aspect ratio (L/D) of at least about 25 to 1; they must have a relatively high tenacity, preferably a tensile strength at least three times that of the matrix material; and an elongation at break exceeding that of the matrix material.

Preferred lubricant fibers for use in the practice of this invention are oriented polytetrafluoroethylene fibers. These are available, for example, from E. I. Du Pont de Nemours under their trade designation Teflon TFE fluorocarbon fibers and are described in the literature as having an elongation of 19 percent at break, an ultimate tensile strength of over 50,000 psi. (a tenacity of about 2 grams per denier) and a coefficient of friction as low as 0.01. The fibers are available in lengths of between about $\frac{1}{4}$ and $\frac{3}{8}$ of an inch, have diameters of about 5 mils and have aspect ratios greater than about 50 to 1.

To be suitable for use with the fibers of this invention, the matrix material should have sufficient toughness and strength to act as a bearing material under the conditions of intended use; however, it is believed that their tensile strength should be no more than one-third that of the fibers and the elongation somewhat less than that of the fibers. It is also believed that an appropriate matrix material for use with the above identified PTFE fibers is one in which the product of the ultimate tensile strength and the percent elongation at break is less than about 1,500 and preferably less than about 1,000 but not less than about 100. When the mechanical properties of the matrix material are above these values, it is sometimes possible to modify them to fall within the preferred range as by adding plasticizers or by adjusting the moisture content or the temperature of the matrix material at the time of machining.

The fact that PTFE is relatively inert to other plastic materials is advantageous in that chemical bonds between the matrix and the fibers do not develop and the fibers will more readily disengage themselves from the chips of the matrix material during machining. For the same reason, however, it is important that the fibers have a substantial length, that is over at least $\frac{1}{4}$ inch, so that they will be mechanically gripped by the matrix and not readily pulled out during machining.

Maximum utilization of the fibers can be achieved when they are oriented with their principle axis perpendicular to the surface of the matrix. This is not essential, but, if desired, it can be achieved, for example, by extruding a fluid mixture of the fibers and matrix material through an appropriately designed orifice that will align the fibers at the time a mold cavity is filled.

While the amount of lubricant fibers added is not critical, 2% by weight has provided greatly improved properties of friction and wear. As little as 0.5% addition provides some desirable improvement in properties and, while as much as a 10% addition is feasible, the high cost of fibers, such as made from polytetrafluoroethylene, makes the use of lesser amounts desirable.

The matrix or its precursor materials must at some time be processable as a sufficiently fluid material throughout which the fibers can be uniformly dispersed as, for example, in a melted thermoplastic, in an uncured liquid thermosetting resin, in a liquid monomer, or in liquid precursors of a polymer. The dispersion of the fibers is achieved most readily if they are wet out by the fluid material, but if not, the use of surfactants can be helpful.

Since the fibers are only effective at the surface of the bearing, it may be desirable, particularly if the fibers are relatively expensive, to charge a mold cavity with several successive shots in which the fibers are included only in the shot that will form the wear surfaces.

One desirable family of plastic matrix materials for use in the practice of this invention are rigid polyurethanes which may be polymerization cast from precursor materials such as polyols and isocyanate terminated compounds. Exemplary of these compounds are those sold by Dow Chemical Company under its trade designation of "ISP" resins. These are reported in the literature as comprising polyols having a hydroxyl equivalent weight up to about 125 and isocyanate or isocyanate terminated prepolymers. When suitably catalyzed as with stannous octoate, they rapidly polymerize at room temperature. They are discussed, more fully, for example, in U.S. Pat. Nos. 3,378,511 and 3,726,827.

The tensile strength of the urethane polymers of the above type is in the range of 7,500 to 8,500 psi. and the elongation ranges from 5 to 15 percent. When these polyurethanes are used as the matrix material and PTFE fibers are used as the lubricant fillers, the previously defined criteria are met in that the tensile strength of the matrix is less than one-third that of the fibers, the elongation of the matrix material is less than that of the fibers, and the product of the tensile strength and percent elongation of the polyurethane matrix is in a range of from about 375 to about 1,275.

If desired, other fillers may be included in the matrix such as mineral fibers to improve stiffness, silicone oils to improve dynamic proportions, or additional lubricating additives.

EXAMPLE 1

A reactive mixture was prepared by mixing 73 parts by weight of an isocyanate terminated prepolymer with 26.85 parts by weight of a polyol and 0.15 parts by weight of stannous octoate catalyst. The isocyanate terminated prepolymer was obtained from Dow under their trade designation Voranate MR111 and is described as having 18% free NCO, a viscosity at 77° F. of 275 centistokes, a viscosity at 100° F. of 280 centistokes and a specific gravity at 77° F. of 1.087.

2% by weight of ¼ inch oriented polytetrafluoroethylene fibers were hand mixed into the reactive mixture. These fibers were obtained from Du Pont under their trade designation Teflon TFE fluorocarbon fibers and are described as having an elongation of 19% at break, an ultimate tensile strength of over 50,000 psi, a coefficient of friction as low as 0.01, average diameters of about 5 mils, and aspect ratios greater than about 50 to 1.

The above formulation was poured into a mold that had been preheated to 200° F. An exothermic reaction immediately commenced which was substantially completed at the end of one minute.

As a control, the above procedure was repeated except that the PTFE fibers were omitted.

Samples from the two cast articles were evaluated for various properties and the data obtained is contained in the following table:

| Property | Unfilled Polyurethane (Control) | Fiber Filled Polyurethane |
|---|---|---|
| Coefficient of Static Friction | .39–.53 | .22–.33 |
| Coefficient of Kinetic Friction | .38–.41 | .30–.31 |
| Limiting PV | 10,000 | 18,750 |
| K Wear Factor ($10^{-10}$) | 4,800 | 290 |

The test procedure used above to determine the K wear factor is a common one in the plastic bearing art in which a ½ inch diameter journal bearing is machined from the sample and a steel shaft is inserted into the bearing for rotation. The shaft is rotated under loads measured in pounds per square inch and at velocities measured in feet per minute and the wear depth of the journal bearing is measured in inches after 200 hours. K is then calculated by substituting the recorded values in the following equation:

$$K = h/PVT$$

in which h is the wear, P is the pressure, V is the velocity, and T is the time. This results in a K number having units of $in.^3 min./ft.lb.hr.$ and, for convenience, is expressed in values of $10^{-10}$.

The limiting PV value given in the examples is an arbitrary number which indicates the PV loading under steady state conditions at which the bearing temperature reaches 300° F.

It should be noted that when the journal bearing of the fiber filled test specimen was machined, numerous fiber ends were left exposed over the machined surface which had the appearance not unlike the fuzzy surface of a peach. This type of surface is obtained whether the test specimen is machined, as in a lathe, sawed, drilled, or sanded as with coated abrasives.

EXAMPLE 2

In the above Example, the invention was discussed in respect to improving properties such as friction, limiting PV and bearing wear factor. In addition, in many bearing applications particularly where the bearing surfaces slide against each other as in machine wear plates, abrasion resistance is also an important property.

A common method for screening bearing materials as to their abrasion resistance is the Taber abrasion test in which specified grinding wheels are run over machined specimens under standard loading conditions. The weight loss is measured per thousand revolutions and the number obtained provides good information as to the relative abrasion resistance of the bearing.

In this Example a control specimen and a fiber filled specimen were prepared using the procedures of Example 1 except that in this Example 2, the specimen was filled with 3 percent by weight polytetrafluoroethylene fibers having an average length of ⅜ of an inch. After the surface of the filled specimen was machined to expose fiber ends, a test was run on the Taber abrader using a CS-17 wheel and a 1 kilogram load. The unfilled specimen showed a weight loss of 140 mg./1,000 revolutions and the specimen filled with the fibers showed a weight loss of only 80 mg./1,000 revolutions.

Visual inspection of the unfilled specimen showed a clearly visible track where the grinding wheel had worn material away, as is expected and conventional. Surprisingly, however, in the case of the specimen filled with the PTFE fibers, no visible track was left by the grinding wheel. This suggests that the weight loss indicated of 80 milligrams was mostly occasioned by grinding off the free ends of the fibers rather than by abrasion of the matrix surface. It may be concluded that the weight loss of the matrix material of the fiber filled specimen was far less than the measured value.

I claim:

1. A method of preparing a bearing surface comprising the steps of:
   (1) dispersing about 0.5% to 10% by weight of oriented polytetrafluoroethylene fibers in a liquid monomer or precursor of a rigid polyurethane polymer;
   a. the oriented fibers being characterized by tensile strengths in excess of 25,000 psi, elongations of at least ¼ inch, and aspect ratios (L/D) of at least 25 to 1;
   b. the liquid monomer or precursor of a rigid polyurethane polymer being characterized in that the polymerization product will have a tensile strength between about 7,500 and 10,000 psi, and an elongation at break of less than about 15%;
   (2) polymerizing the dispersion to form a rigid polymeric matrix holding the oriented fibers;
   (3) cutting into the polymeric matrix, as by turning, sawing, drilling or sanding to remove matrix material and expose a bearing surface having a plurality of fibers partially imbedded in the matrix with free ends extending out of and beyond the cut surface of the matrix.

* * * * *